United States Patent
Frosch et al.

(10) Patent No.: US 9,727,757 B2
(45) Date of Patent: Aug. 8, 2017

(54) SYSTEM AND METHOD FOR READING ONE OR MORE RFID TAGS IN A METAL CASSETTE WITH AN ANTICOLLISION PROTOCOL

(75) Inventors: Reinhold Frosch, Hart bei Graz (AT); Andreas Zielasch, Lutry (CH); Nicolas Gehrig, Lausanne (CH)

(73) Assignee: SATYATEK SA, Vevey (CH)

( * ) Notice: Subject to any disclaimer, the term of this patent is extended or adjusted under 35 U.S.C. 154(b) by 529 days.

(21) Appl. No.: 13/258,593

(22) PCT Filed: Mar. 23, 2010

(86) PCT No.: PCT/IB2010/051259
§ 371 (c)(1),
(2), (4) Date: Dec. 7, 2011

(87) PCT Pub. No.: WO2010/109412
PCT Pub. Date: Sep. 30, 2010

(65) Prior Publication Data
US 2012/0075074 A1   Mar. 29, 2012

(30) Foreign Application Priority Data
Mar. 23, 2009   (EP) .................................. 09155915

(51) Int. Cl.
*H04Q 5/22* (2006.01)
*G06K 7/00* (2006.01)
*G06K 7/10* (2006.01)
*H01Q 1/22* (2006.01)
*H01Q 7/00* (2006.01)

(52) U.S. Cl.
CPC ....... *G06K 7/0008* (2013.01); *G06K 7/10316* (2013.01); *G06K 7/10336* (2013.01); *G06K 7/10435* (2013.01); *H01Q 1/2216* (2013.01); *H01Q 7/00* (2013.01)

(58) Field of Classification Search
CPC ....... G06K 2017/0045; G06K 7/10356; G06K 7/10019; G06K 19/07779;
(Continued)

(56) References Cited

U.S. PATENT DOCUMENTS

| 6,703,935 B1 | 3/2004 | Chung |
| 6,995,729 B2 * | 2/2006 | Govari .................... H01Q 7/00 343/867 |

(Continued)

FOREIGN PATENT DOCUMENTS

| FR | 2890227 A1 | 3/2007 |
| WO | WO 2008/031630 A1 | 3/2008 |
| WO | WO 2009/003231 A1 | 1/2009 |

OTHER PUBLICATIONS

International Search Report prepared by the European Patent Office on Jul. 27, 2010, for International Application No. PCT/IB2010/051259.

*Primary Examiner* — Kerri McNally
*Assistant Examiner* — Sharmin Akhter
(74) *Attorney, Agent, or Firm* — Sheridan Ross PC (57) ABSTRACT

Reading apparatus for objects each bearing at least one RFID tag, said objects being placed in a cassette that can also be furnished with an RFID tag, said system comprising at least one element in the form of a tunnel in which said cassette can be placed, said element comprising at least one antenna and one RFID reader, said antenna comprising at least two coils composed of several turns, said coils being distributed along and around said tunnel.

13 Claims, 5 Drawing Sheets

(58) Field of Classification Search
CPC ......... G06K 19/07749; G06K 19/0723; G06K 19/07754; G06K 19/07783; G06K 19/06206; G06K 19/073; G06K 19/07773; G06K 19/07794; A61M 2205/12; A61M 2205/6054; A61M 2205/273; A61M 2205/60; A63F 2300/1031; A63F 2009/2489
USPC ................................ 340/10.1–10.6; 235/492
See application file for complete search history.

(56) References Cited

U.S. PATENT DOCUMENTS

| | | | | |
|---|---|---|---|---|
| 7,116,229 B1* | 10/2006 | Miramontes | ............ | H04B 1/202 340/10.51 |
| 8,056,819 B2* | 11/2011 | Rowell | ............ | G01R 33/34007 235/487 |
| 2004/0052034 A1* | 3/2004 | Senba | ................. | G06K 19/041 361/600 |
| 2008/0001748 A1* | 1/2008 | Childress | ............... | G06K 17/00 340/572.1 |
| 2008/0094179 A1* | 4/2008 | Domenico | ......... | G06K 7/10435 340/10.1 |
| 2008/0106382 A1* | 5/2008 | Choi | ................. | G06K 7/10049 340/10.2 |
| 2010/0126071 A1* | 5/2010 | Hill | ......................... | E06B 7/32 49/70 |
| 2010/0265044 A1* | 10/2010 | Muehlmann | ....... | G06K 7/10019 340/10.4 |
| 2012/0056718 A1* | 3/2012 | Leutgeb | ............ | G06K 19/0712 340/10.1 |

* cited by examiner

SYSTEM AND METHOD FOR READING ONE OR MORE RFID TAGS IN A METAL CASSETTE WITH AN ANTICOLLISION PROTOCOL

CROSS REFERENCE TO RELATED APPLICATIONS

This application is a national stage application under 35 U.S.C. 371 of PCT Application No. PCT/IB2010/051259 having an international filing date of 23 Mar. 2010, which designated the United States, which PCT application claimed the benefit of European Application No. 09155915.3 filed 23 Mar. 2009, the entire disclosure of each of which are hereby incorporated herein by reference.

The present application claims priority of the European application No. 09155915.3 of 23 Mar. 2009, the entire content of which is incorporated herein by reference.

FIELD OF THE INVENTION

The present invention concerns a method and a device for implementing the detection of RFID tags (Radio Frequency Identification) in a closed metal box. More specifically, the present invention can be used for identifying, inventorying and tracking the objects contained in a cassette (a sterilisation cassette, for example), automatically and establishing any direct contact to the RFID-tagged objects, as well as the cassette itself.

STATE OF THE ART

There are various methods and technologies for identifying and tracking information related to an object (such as its serial number, its manufacturer, etc). Currently, the most frequently used solutions consist in the identification by means of a data matrix code (a two-dimensional optical code which is applied by a laser or by means of micro-percussion onto the surface of the object to be marked), a bar code or an RFID marker (currently referred to as a "tag" or "RFID tag").

In the case of RFID technology, an integrated circuit (IC) is encapsulated in a metal chip (as described in FR patent No. 2868939 (A1), for example), forming a tag, and the chip is then welded or adhered to the object to be marked. These tags are only readable when they are in contact with the antenna or from a distance of some millimetres.

These marking techniques, thus, do not allow for an automation of these tasks and processes (especially of the processes for identifying and tracking individual objects) and require human intervention. Each object has to be identified, read one by one, by means of an optical reader or an RFID reader, depending on the marking technology which was applied. In order to do this, the object has to be oriented and positioned in a suitable way in relation to the optical or RFID reader in order to enable said reader to read the information. This manual identification or reading operation is very time-consuming; moreover, there is a great risk that the identification of some of the objects is forgotten or that some of them are identified several times, which results in an erroneous inventory or interferes with the trackability of the objects.

The size of optical codes (bar codes, data matrix codes) is limited, due to the limited resolution of optical readers, and the amount of information which can be stored in the symbol is limited due to the restricted surface area of some objects. Moreover, the information contained in the optical codes is permanent and cannot be modified any more.

Some RFID tags can, however, offer read/write memories and can be authenticated as original tags. More specifically, the identification code may be guaranteed to be unique, and part of the memory of the tag may be accessible to reading/writing, which means that the information contained in this part may be modified and up-dated. The persistence of the information contained in the optical symbol is not guaranteed. If the optical symbol degrades, is dirty or covered, for example by fabric, the information is no longer accessible. Moreover, the RFID tags available on the market only guarantee the non-volatility of data for 10 years at least.

However, for instruments in other materials than metal, it is possible to read the RFID tag affixed onto or into these instruments from a certain distance. But if they are contained in a closed metal container, these RFID tags are neither automatically readable nor can they be read from a distance. But in the case of the RFID contact or quasi-contact reading process, no anti-collision algorithm is used or usable or required, because it is not possible that several RFID tags are present in the magnetic field generated by the RFID antenna.

U.S. Pat. No. 7,088,249 describes RFID effects due to slits in the metal or RFID proximity effects (induction within the metal due to contact or immediate proximity). This patent does, however, not describe the possibility of identifying a multitude of tags in the interior of a closed metal box.

The publications WO 2007/090026, WO 2006/063103, WO 2006/026289, and WO 2006/026246, which are incorporated herein by reference, describe systems and methods for identifying objects, especially surgical instruments, applying RFID technology.

The document WO 2007/090026, for example, shows a transport tray for surgical instruments which are RFID-tagged. One of the aims of the system described consists in proposing RFID tags which are capable of resisting sterilisation, which is indispensable for instruments used for surgery. The tray is rectangular and consists of plastics or metal, and, like the individual instruments contained in the tray, carries an RFID tag, which makes it possible to track these objects (both the tray and the instruments).

The document WO 2006/063103 shows a system and a process for reading RFID tags on surgical instruments. More specifically, this application describes a tray (made of plastics or metal) having an RFID tag and containing said instruments, which themselves are also RFID-tagged. According to this application, an open tray which contains instruments is taken onto an RFID reading table for identification purposes. This table comprises several RF antennas for reading the tags of the objects (said tray and said instruments) which are placed on the table. The antennae are used for generating an RF excitation signal which makes the emission of the information contained in the RFID tags possible (according to the functional principle of RFID detection). The received information is analysed, for example by IT means, and can be processed, compared, etc, depending on the desired processing (determining the localisation of an object, validating its presence in the tray, determining the "age" of the instruments, etc). The result of this analysis can then lead to the transmission of information to the user or to an IT system for further processing. The system described in this publication is open in a sense that both the tray and the table are not closed.

The document WO 2006/026289 describes an automatic reading system for surgical instruments, which are contained in a tray, applying RFID techniques. More specifically, the system comprises a case with an internal antenna and a reader which is connected to said antenna; the tray is introduced into the case. The reader of the case emits RF waves via the antenna and, in this way, is capable of detecting the instruments in the tray as well as the tray itself. The tray may be of the type described in the above-mentioned application WO 2006/026289. As it is possible that several instruments are present in the tray, an anti-collision protocol is used for a correct acquisition of the different generated signals.

PRINCIPLE OF THE INVENTION

One aim of the present invention consists in proposing a system which is capable of detecting the presence of objects in a cassette, which is preferably made of metal and closed, from the exterior of said cassette, applying RFID technology.

More specifically, one of the aims of the present invention consists in proposing an RFID reader which allows for the detection of several objects with an RFID tag.

DESCRIPTION OF THE INVENTION

In general, an RFID system can be seen as the combination of the following three elements:
an RFID tag or a transponder
an RFID reader or transceiver
the data of the processing sub-system An RFID tag usually consists of an antenna, a wireless sensor (or electronic chip or integrated circuit (IC)), and a covering material. The electronic chip contains an identifier and, optionally, complementary data.

An RFID reader generally comprises an antenna, the sender/receiver, and a decoder which transmits periodic signals in order to obtain information from the nearby transponders. Whenever a tag signal is received, the information obtained is transmitted to the data processor.

The data processing sub-system provides means for processing and storing/transmitting the received data.

For the identification of metal objects which are operated in environments which may be metallic, such as dental and medical instruments in closed metal cassettes, wire netting trays, mesh trays, or sterilisation trays, a low frequency (124-135 kHz) is preferable due to a lower sensibility to the decalibration of the RFID parameters (detuning); this phenomenon is observed at a high frequency of 13.56 MHz, and uncontrollable reflexions and suppressions of signals are observed at ultra-high frequencies of 433/868/915 MHz, 2.45 and 5.8 GHz.

The tags which are used in the framework of the present invention are passive tags which are commonly used on the market and function at low frequencies. It is also possible to use active tags.

Such a passive RFID tag consists of an antenna, a chip, which is linked to the antenna, and a covering material. Passive tags use the energy which is induced by the electromagnetic field of the RFID reader.

The most common antennae of RFID tags can be classified into two types: those which are disc-shaped and use a circular antenna (air coil) and those which are cylindrical and use an antenna with a ferrite core.

The aspect of the tags depends on the form of the different antenna windings, i.e. one is disc-shaped, while the other is rod-shaped
  a. cylindrical with a ferrite; the inductance is generated by the ferrite.
  b. circular; the inductance is generated by the surface which is defined in the antenna's interior.

The selected tags have to allow for the implementation of anti-collision. Many RFID tags which are commonly available on the market have this function.

The reading of several RFID-tagged instruments in a magnetic field requires the use of anti-collision algorithms. If no anti-collision method is applied, it may happen that the reader receives signals from several tags at the same time, which would lead to a confusion of the received data and would make it impossible to decode the information. Consequently, it would not be possible to detect all the RFID tags nor to capture their unique identifiers. A relatively homogeneous magnetic field is, however, required for readings based on anti-collision algorithms to be successful, because a signal which is too low would not be taken into consideration, which would result in an incomplete reading of the present population of tags.

General Anti-collision Algorithms:

Some contactless applications require simultaneous or selective communication with RFID devices. In order to communicate individually with a device of the group of devices, it is necessary to identify the target device before it can be addressed. Consequently, the reader (or read/write module) has to start with a "who is there"-call. All the tags can then respond simultaneously with their identification codes. The process has to distinguish all these replies; the correct reading of the identification codes is referred to as anti-collision process. There are different anti-collision methods for identifying a device in the group of devices. The anti-collision algorithms may explore the spatial domain, the temporal domain, or the frequency domain in order to identify multiple tags. One option based on the temporal domain consists in the utilisation of transponders with random response times. If the number of transponders which are simultaneously present in the magnetic field is not too high, there is a higher likelihood that a first device can be identified, before a second one gets mixed up with it.

One of the anti-collision principles consists in the "adaptive binary tree", but with additional functionalities in order to allow for the detection of 800 tags in 33 seconds, for example.
  AC encoding of the tag signal
    the controller of the reader has a DSP ("digital signal processing unit") functionality for detecting collisions at the level of each bit
    specific algorithm for guaranteeing a rapid and reliable detection of all transponders in the field
  I/Q demodulator, adaptive sampling.

US application No. 2009/040021, for example, describes a process for the detection of tags, applying the above-mentioned technique, its content being incorporated herein by reference.

Other anti-collision algorithms may, of course, be used in the framework of the present invention, but they may probably have a negative influence on the execution speed.

The architecture of the RFID reader (read/write module) has to be able to implement anti-collision and to process and filter disturbed analogic signals.

It is possible to use different readers, which are available on the market, provided that they have the following functions:
  AC encoding of the tag signal
  digital processing of the signal for detection collisions at the level of each bit specific algorithm for a rapid and reliable detection of all the tags in the field I/Q demodulator with adaptive sampling Design of the External Antenna The preferred architecture of the antenna which is able to create a homogeneous field, even in the presence of metal objects, is tunnel-shaped; it is a three-dimensional antenna which is wound around a hollow structure in the form of an open tray which receives the objects to be identified. It is, for example, possible to use antennae of the Helmholtz-type.

One-antenna-system

In the case of cylindrical tags, the tags are preferably not positioned parallel to the antenna. If this is the case, it is not always possible to detect the tags. Ideally, the tag is positioned perpendicular to the antenna (on the axis of the tunnel). The inventors' measurements allowed for a deviation of about +/−45° in relation to this ideal position, in some cases for an even greater deviation.

The cassettes which are used are sterilisation cassettes which are commonly available on the market. These cassettes may, for example, consist of stainless steel, plastics, aluminium, etc. The cassettes may also be sterilisation trays, perforated trays, or mesh trays. On the dental and medical market, the terms "containers", "receptacles", "boxes", "kits", "sets", and "templates" are also used. Examples of sterilisation cassettes according to the state of the art can be found on the Internet sites of the following companies:
i) http://www.omb-meditech.com
ii) http://www.wagner-steriset.de The design of the cassettes has less influence on the performance (reliability) of the reader of the system than the material they are made of. When the cassettes were hermetically sealed with a copper band, we found that the field in the interior remained homogeneous and was only reduced to about half of the field strength in the area around the metal cassette.

It was noted that a container which entirely consisted of metal and contained several wholly metallic instruments, which also consisted completely of metal and were each RFID-tagged, could be identified without requiring any further handling.

If the container consists of aluminium, the reading is significantly less efficient, which is why it is assumed that the container material has to be highly conductive (stainless steel, steel, or copper being non-limiting examples).

As the cassette is hermetically sealed by a copper sheet, the magnetic field is forced to pass through the metal. This leads to the generation of eddy currents which in turn cause the homogeneous magnetic field within the cassette to be reduced by about 50%. But the magnetic field within the cassette is still sufficiently strong and homogeneous for identifying, reading, and writing all the RFID tags.

Some cassettes have openings serving as passages for the water vapour during the sterilisation process in an autoclave under water vapour which allows for a sterilisation of the cassette's contents. In order to make sure that the magnetic field does not propagate through these interstices, we closed the openings by means of a copper film. This way it can be made sure that the magnetic field crosses the metal (in the case of metallic sterilisation cassettes) and that it is not just a simple reflexion of the magnetic field.

The height positioning of the tags in the closed metal box (or cassette) does not have any influence on the performance; therefore, all tags can be identified, independent of their positions in the box, as long as they are oriented in the right way.

The field in the interior of the metal box is reduced, but remains sufficiently strong in order to provide all the tags with the energy required for detecting them and for exchanging information. The field is homogeneous in the tunnel (and in the box). A cylindrical tag (antenna made of ferrite) captures the field lines ($\mu R$ air~1; $\mu R$ ferrite>1,000).

In the case of a metal rod tag with a ferrite antenna, there is less detuning than in the case of a disc-shaped antenna (air coil).

The detected RFID tags make it possible to compile an inventory and/or to follow (track) the objects in hospitals, clinics, dental or medical offices, centralised sterilisation institutions, or groups of hospitals, clinics, dental or medical offices, or in the case of an exchange (or renting or sale) of materials between manufacturers of medical devices and their customers. The above-mentioned examples do not constitute a limitation, but only serve illustrative purposes.

In order to avoid any risk of infection, it is very important or, in the medical and dental field, even required by law to make sure that an instrument or a batch of instruments, which is/are stored in a metal cassette, was/were properly sterilised before it is/they are used or re-used.

The RFID tags or transponders may identify both the contents of a cassette and the container (cassette) itself.

The proposed solution allows for reading an identification code or information stored in the memory of an RFID tag which is fixed on the object(s) (especially on medical and dental devices) made of metal or composite materials by means of RFID. The reading is carried out automatically and without directly contacting the object(s). The reading is carried out through a closed metal box according to certain criteria described in the present patent. Moreover, the multiple reading of several RFID tags on metal objects in an anti-collision mode is carried out through a closed metal box. The reading takes some seconds and allows for collecting the unique identifier of the IC, for reading the data stored in the IC's memory, if the IC is provided with a memory, and for writing or replacing the data contained in the memory of the chip. This makes it possible, for example, to capture the identities of the sterilised instruments or of the instruments to be sterilised or to make sure that the container's content actually corresponds to a list of the instruments.

The structure of the receiver which is used allows for a simultaneous detection of both amplitude and phase modulation, which is done, for example, by means of an adaptive phase shift of the sampling times of the carrier wave (see I/Q demodulator).

The RFID tags are either fixed directly on the surface of the instrument, for example in the case of retrofit solutions for existing instruments, or encrusted onto or into "original equipment" instruments when the manufacturer of the instruments is able to modify their design. In both cases, it has to be possible for the system for attaching the RFID tags to be industrialised and automated.

The present invention allows especially for the following results to be obtained:
  reading one to hundreds of instruments consisting of a composite material or metal, each of which being tagged with an RFID tag
  reading instruments which are placed on a tray by means of antennae, regardless of the orientation of the instruments on the tray
  automatic reading of several instruments in real time from a distance of 0-20 cm, the instruments being placed on a tray made of composite materials or metal (such as aluminium or stainless steel)

reading is also possible within a completely closed cassette made of plastics and aluminium reading also through a stainless steel cassette with holes or slits (such as a perforated sterilisation cassette according to the effective DIN norms concerning the passage of vapour through cassettes)

reading of metal instruments in a box or on a tray within a stainless steel sterilisation vessel; the antenna being designed in order to allow for the reading of the tags on the instruments which are placed directly in the sterilisation vessel, for example.

The cassette itself can be read using its RFID tag which is, for example, attached to one of its sides. The instruments can be read in the closed cassette which is placed in the steriliser. The distance between the antenna and the cassette(s) amounts to several centimetres, and the automatic reading of the tags on the instruments and on the cassettes is still possible in spite of this distance, if the cassette or the instruments are located close to the antenna.

The tray is pushed into the steriliser or into the external tunnel of the reader, and all the RFID tags on the instruments are read automatically, even through closed cassettes which are provided with a lid, including through stainless steel cassettes with holes (the holes being provided as passages for the water vapour during the sterilisation process).

The present invention allows for the simultaneous automatic reading of one to hundreds of instruments provided with an RFID tag, using an antenna which is especially designed for this purpose and connected to a read/write module for RFID tags.

The present invention also allows for the simultaneous reading of one or more instruments which may be made of metal or not and are contained in a metal cassette which may be closed or not.

In the case of instruments (such as dental or medical instruments), it is possible to read the unique identification codes (identifiers) and to read/write information concerning the history of each instrument (number of uses, sterilisations, maintenance interventions, types of interventions, etc) without the occurrence of errors and without causing any losses.

The instruments either have a generally cylindrical (round, ovoid, hexagonal, etc) section and are solid or hollow, or they have a flat form (sections which are rectangular, twisted, flattened, etc).

In a tunnel configuration with one antenna, the instruments, and the RFID tags applied to them, have to be oriented at an angle of +/−45° in relation to the main axis of the tunnel (the central axis of the opening). In some optimum cases, it is still possible to read the tags when the instruments are oriented at an angle of more than +/−60° in relation to the main axis of the tunnel, or even at any orientation of the instruments.

It is possible to read hundreds of instruments within a closed metal enclosure (such as in a stainless steel sterilisation vessel), if the antenna(e) for reading the RFID tags is/are integrated into the vessel of said enclosure (such as the vessel of a steriliser).

The sterilisation process which is applied in hospitals or other institutions is known. The RFID reading antennae and the tags which are integrated into the covers or doors of sterilisers or washing machines are resistant to multiple sterilisation cycles at 134° C. and to disinfections and washings using strong detergents. The unique code which is part of the identification tag is, thus, still 100% readable after it has gone through numerous cycles of the above-mentioned treatments.

It is also possible to read dozens of metal instruments through a closed metal cassette (such as a perforated stainless steel cassette for the sterilisation of dental or medical instruments), and it is also possible to read instruments which are located at a distance of several centimetres from the antennae.

The present invention and its embodiments will be better understood based on the description of the figures attached to the present application, wherein.

DETAILED DESCRIPTION

Figure 1:
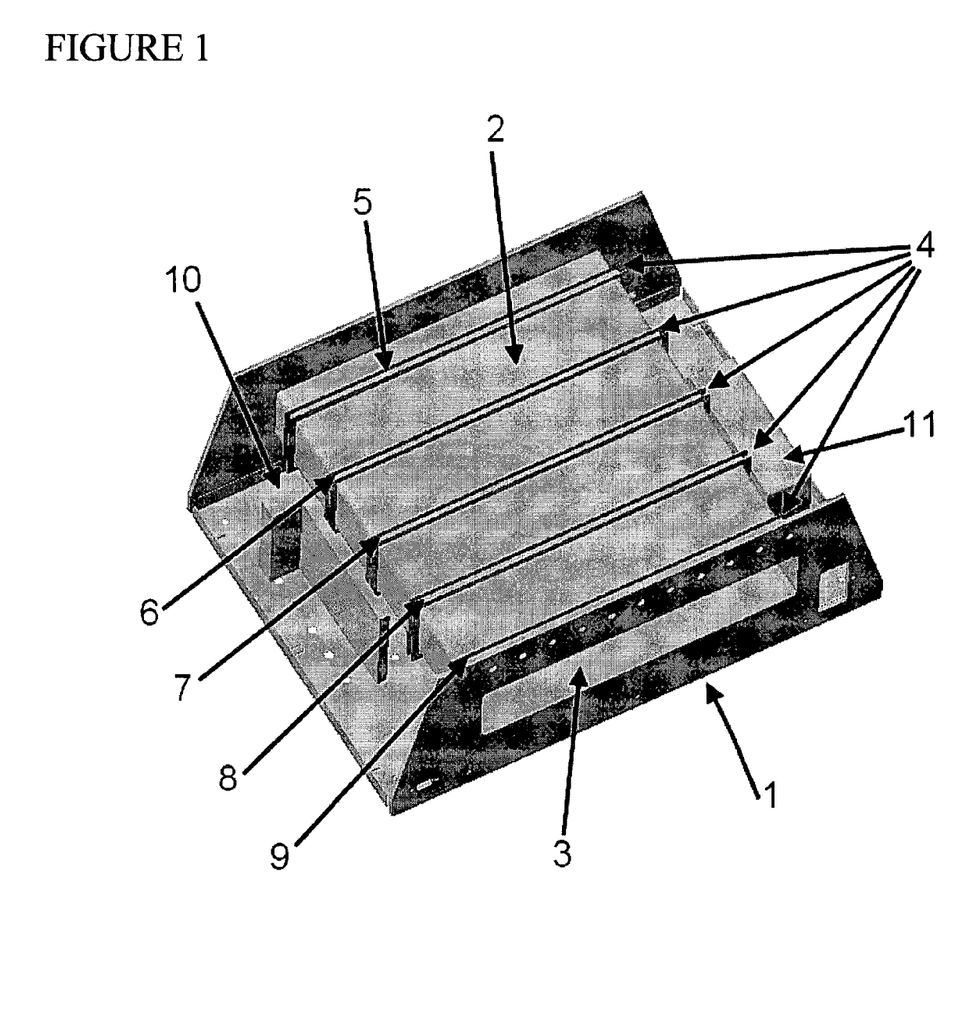
FIG. 1 is a schematic representation of a reader of the present invention.

FIG. 1 is a schematic representation of the reading device 1 according to the invention. This device 1 comprises a body 2 (e.g. made of synthetic or natural materials which may comprise pieces of metal), said body 2 having an opening which forms a tunnel 3. Said tunnel 3 may, for example, be rectangular and is intended to receive the cassettes (not shown) which contain the objects to be detected, applying RFID technology as described above. To this end, the body 2 of the device is surrounded by an antenna 4 which comprises several coils 5 to 9, as illustrated in FIG. 1. More specifically, said coils 5 to 9 are distributed along the body 2 at regular intervals.

Each coil consists of a certain number of wire windings, for example of a copper wire. More specifically, the antenna is formed by a continuous wire, such as a copper wire, which is used for forming successive coils, as illustrated in FIG. 1.

In an exemplary embodiment, five coils 5 to 9 may be distributed along the body 2, the two outer coils 5 and 9 comprising up to 25 windings and the three inner coils 6 to 8 comprising the same number of windings or fewer windings. It is, of course, possible to use fewer coils (three, for example) or more than five coils.

In this illustrative example, the tunnel has a length of less than 500 mm and the coils are spaced apart practically equally from one another, the two outer coils 5 and 9 being located at a distance of some centimetres from the tunnel's edges. The copper wire has a diameter of less than 1 mm.

These values are, of course, only illustrative of one embodiment and are not meant to be limiting in any way. Other configurations (such as a different number of coils, different positions and diagonal orientations of the coils, etc) and other dimensions (relating, for example, to the number of windings, the diameter of the wire, etc) are also possible and can be determined and selected according to the respective circumstances.

The device also comprises an RFID reader 10 which functions according to the above-mentioned principles.

The device also comprises connections (RS232, USB, Ethernet, wireless, . . . ) enabling it to receive and transmit the data to the processing sub-system.

In the course of the process of the present invention, a cassette which is closed (or not) is introduced into the tunnel 3, and the antenna 4 allows for the detection of objects with a tag (including the cassette) according to the above-described principles of RFID. Due to the use of an anti-collision algorithm, it is, of course, possible to detect a plurality of objects.

Figure 2:
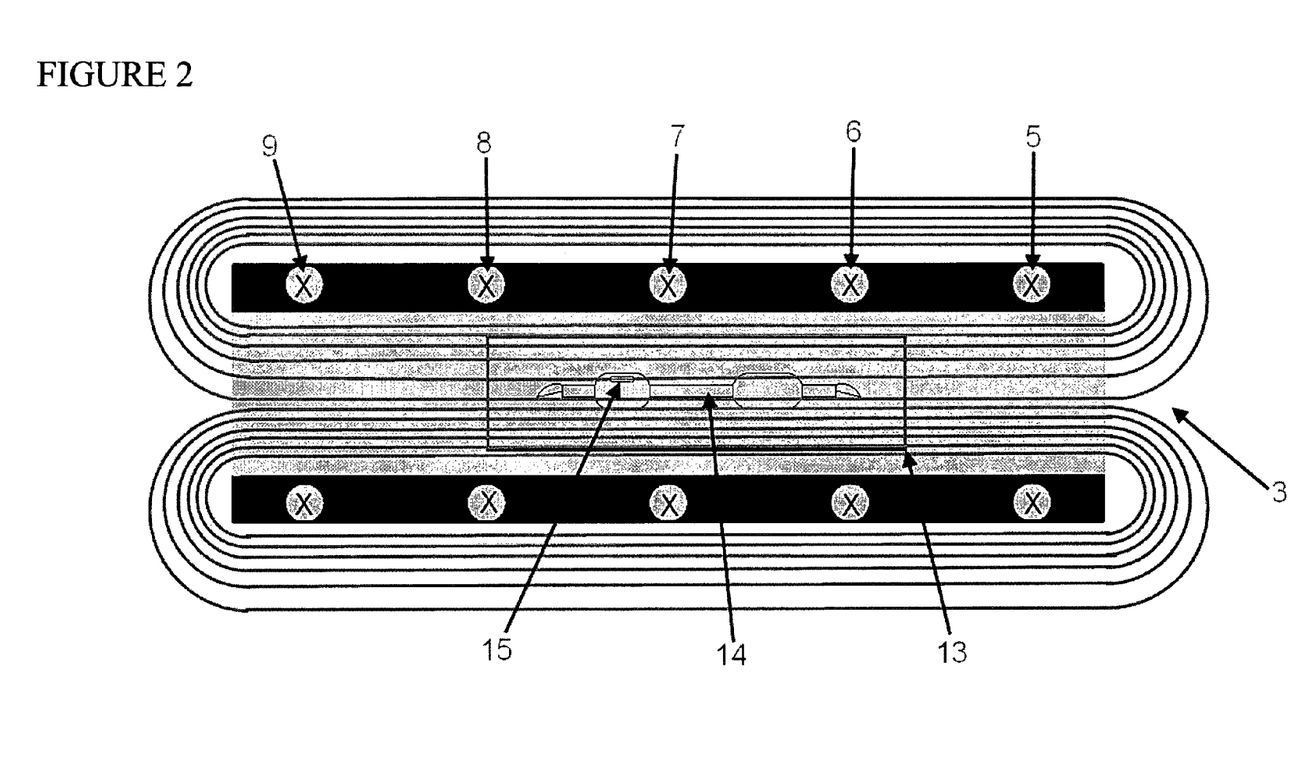
FIG. 2 is a schematic representation of the field pattern within the tunnel.

FIG. 2 shows a schematic representation of the field pattern in the tunnel 3 during detection. More specifically, this figure shows the tunnel 3 around which the coils 5 to 9 of the antenna are arranged. This configuration may correspond to the configuration illustrated in FIG. 1, but other configurations are, of course, also possible, using a different number of coils, for example.

A closed cassette 13 containing objects 14, such as medical instruments (without being limited thereto), is introduced into the tunnel 3. Each object 14 (and optionally the cassette 13) carries an RFID tag 15 which allows for its individual detection according to the principles of RFID.

Reference number 16 identifies the field lines which are generated within the tunnel 3 during the detection in order to activate the tags 15 of the objects.

Figure 3:
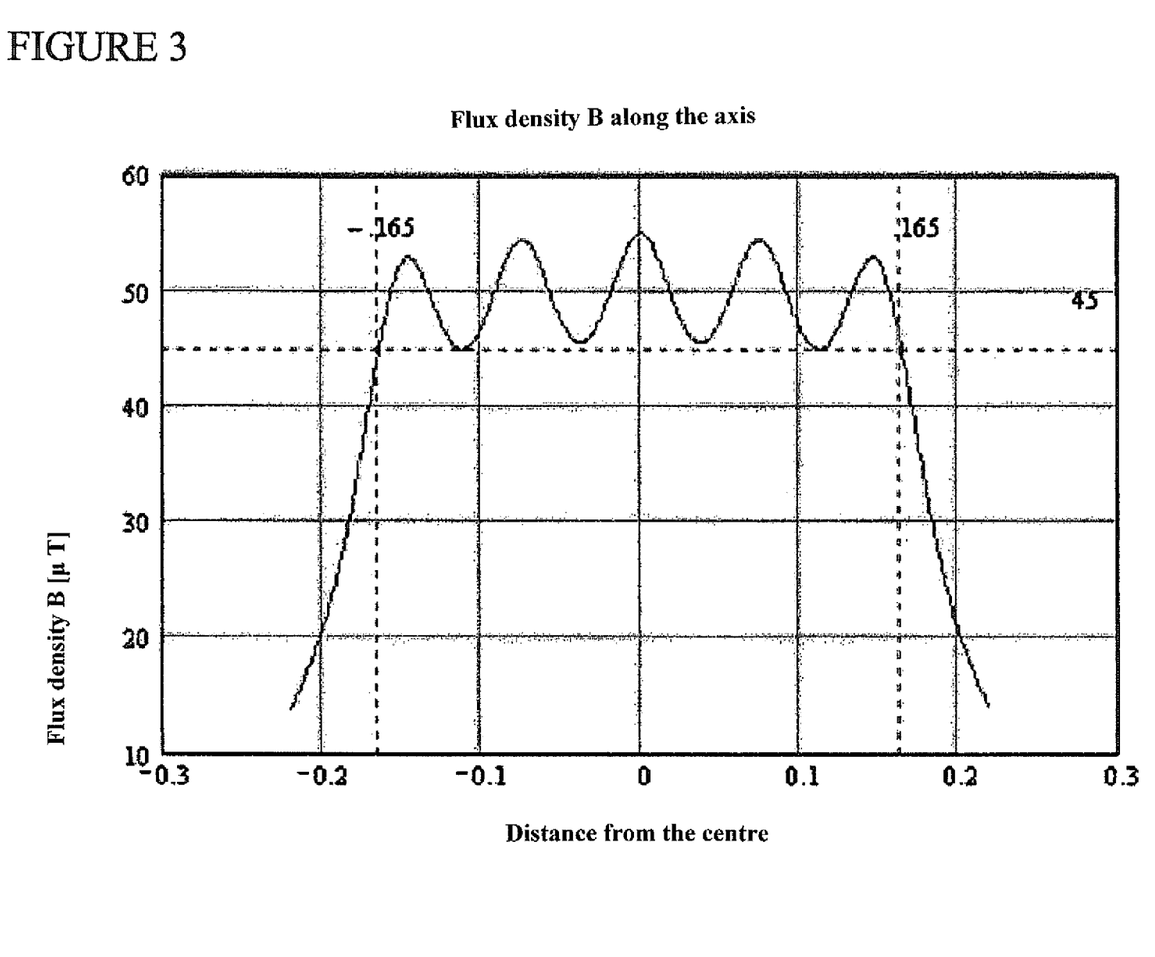
FIG. 3 illustrates the flow density within the tunnel.

FIG. 3 schematically illustrates the flow density in the tunnel as a function of the distance along the tunnel's axis. The indicated values, of course, constitute exemplary data and are not meant to be limiting.

Figure 4:
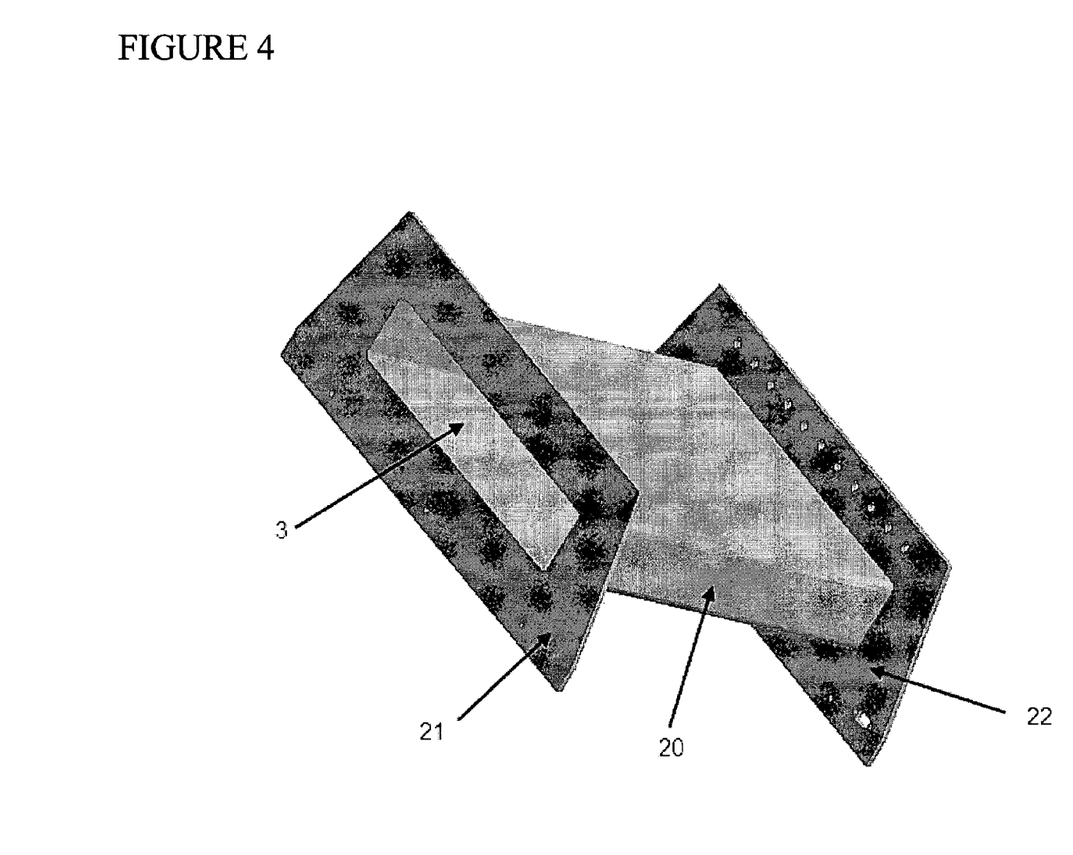
FIG. 4 illustrates the tunnel itself.

FIG. 4 shows a perspective view of the structure of the tunnel 3 which does not have to consist of metal (it may, for example, be made of plastics). This structure in particular comprises a central part 20 forming the tunnel around which the antenna is mounted (see FIG. 1) and two lateral walls 21, 22.

Figure 5:
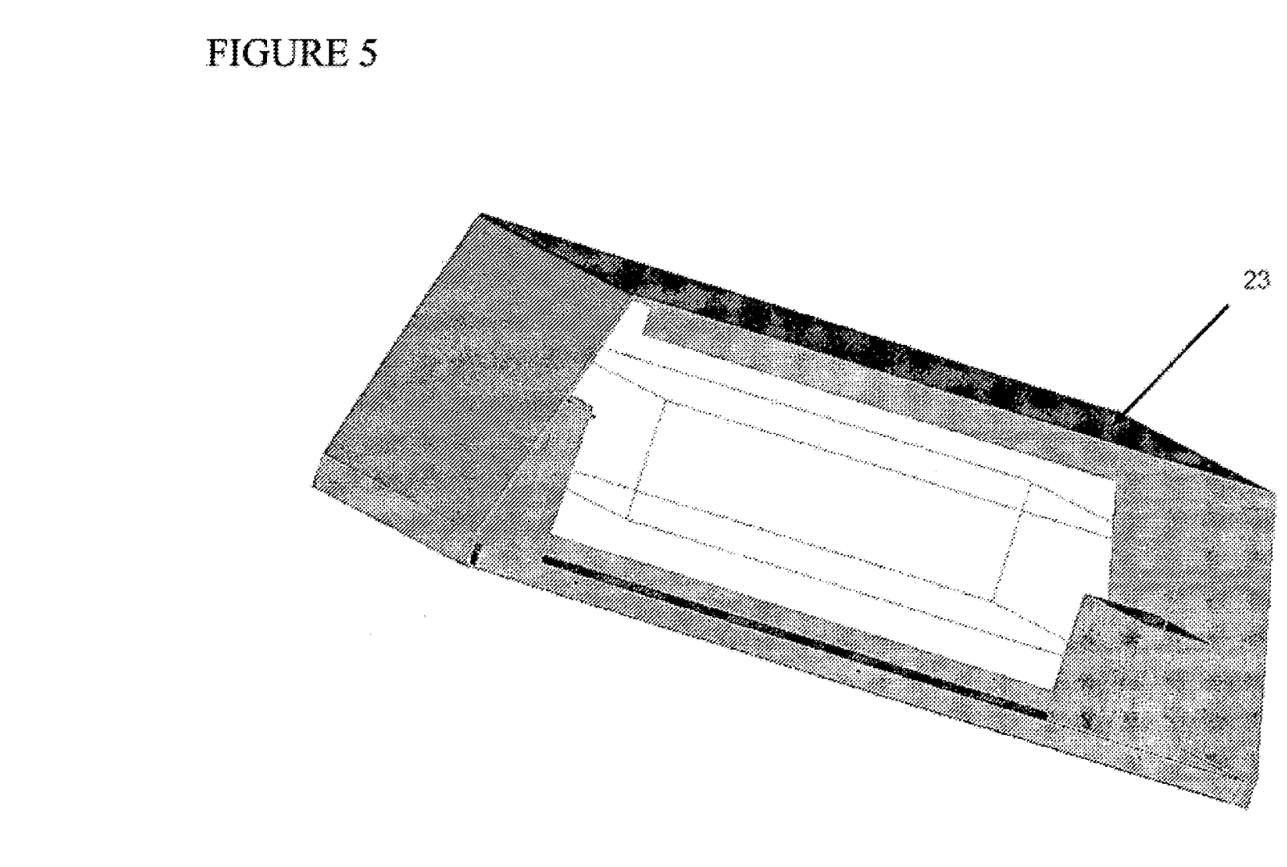
FIG. 5 illustrates the cover which is arranged around the tunnel.

FIG. 5 schematically illustrates parts of the tunnel which are made of stainless steel (for example; they may also be made of an equivalent material) and which form the cover 23 of the tunnel.

The above examples, of course, only serve illustrative purposes and are not meant to be limiting. As already mentioned above, the cassettes are preferably made of metal and closed. In variations of the inventive method, they may also be open and/or non-metallic or partially made of metal, the tunnel according to the invention allowing for implementing the detection in all of these different configurations.

Moreover, the principle of the tunnel according to the present invention may be used alone (as illustrated in FIG. 1), or the tunnel may be integrated into another system, such as a steriliser, as mentioned above. This way, the system allows for a direct identification of the objects which are being sterilised. Other applications applying the principle of the present invention and its application in other contexts than that of sterilisation are, of course, possible: every use in connection with identifying and/or tracking objects may appeal to the principle of the present invention.

The invention claimed is:

1. A reading apparatus for objects with at least one RFID tag, said objects being placed in a cassette, said apparatus comprising at least one tunnel-shaped element into which said cassette is placed, said at least one tunnel-shaped element comprising at least one antenna and an RFID reader, said at least one antenna comprising at least three coils formed by a continuous wire, each coil comprising several windings, said at least three coils being distributed along and around said at least one tunnel-shaped element, wherein the windings of the at least three coils are perpendicular to the at least one tunnel-shaped element's main axis and the at least three coils are spaced apart from each other at regular intervals along said at least one tunnel-shaped element and are parallel to each other, and wherein the reading apparatus reads one or several low-frequency tags operating at a frequency range of between 124 and 135 kHz, which tags are rod-shaped and have an anti-collision protocol and which are attached to or incorporated into objects consisting of metal and/or synthetic materials, said rod-shaped tags being disposed with their longitudinal axis in a direction within a range of +/−45° in relation to the main axis of the at least one tunnel-shaped element.

2. The reading apparatus according to claim 1, comprising at least the following functional modules:
   an AC coding of a RFID tag signal;
   a digital processing of the signal for detecting collisions at the level of each bit;
   a specific algorithm for a rapid and reliable detection of all the tags within the field; and
   an I/Q demodulator with adaptive sampling.

3. The reading apparatus according to claim 1, wherein the at least three coils comprises at least one internal coil arranged between two external coils.

4. The reading apparatus according to claim 3, wherein the two external coils each comprise at least 25 windings.

5. The reading apparatus according to claim 3, wherein the at least one inner coil comprises as many windings as the two external coils or fewer windings than the two external coils.

6. The reading apparatus according to claim 1, wherein the continuous wire forming the at least one antenna is a copper wire having a diameter of less than 1 mm.

7. The reading apparatus according to claim 1, wherein the at least three coils are evenly spaced apart.

8. An RFID reading system comprising at least one tunnel-shaped element, and at least one cassette which contains at least one RFID-tagged object placed in said at least one tunnel-shaped element, said at least one tunnel-shaped element comprising at least one antenna and an RFID reader, said at least one antenna comprising at least three coils formed by a continuous wire, each of said at least three coils comprising several windings, said at least three coils being distributed along and around said at least one tunnel-shaped element, said at least three coils are perpendicular to the main axis of the at least one tunnel-shaped element, and said at least three coils are spaced apart from each other at regular intervals along said at least one tunnel-shaped element and are parallel to each other, and wherein the reading apparatus reads one or several low-frequency tags operating at a frequency range of between 124 and 135 kHz, which tags are rod-shaped and have an anti-collision protocol and which are attached to or incorporated into objects consisting of metal and/or synthetic materials, said rod-shaped tags being disposed with their longitudinal axis in a direction within a range of +/−45° in relation to the main axis of the at least one tunnel-shaped element.

9. The system according to claim 8, wherein the at least one cassette is closed.

10. The system according to claim 8, wherein the at least one cassette is a metal cassette.

11. The system according to claim 8, wherein the at least one cassette is RFID tagged.

12. A reading apparatus for objects with at least one RFID tag, said objects being placed in a cassette, said apparatus comprising at least one tunnel-shaped element into which said cassette is placed, said at least one tunnel-shaped element comprising at least one antenna and an RFID reader, said at least one antenna comprising at least three coils formed by a continuous wire, each coil comprising several windings, said at least three coils being distributed along and around said at least one tunnel-shaped element, wherein the windings of the at least three coils are perpendicular to the at least one tunnel-shaped element's main axis and the at least three coils are spaced apart from each other at regular intervals along said at least one tunnel-shaped element and are parallel to each other, wherein the at least three coils comprises at least one internal coil arranged between two external coils, and wherein the at least one inner coil comprises as many windings as the two external coils or fewer windings than the two external.

13. An RFID reading system comprising at least one tunnel-shaped element, and at least one cassette which contains at least one RFID-tagged object placed in said at least one tunnel-shaped element, said at least one tunnel-shaped element comprising at least one antenna and an RFD reader, said at least one antenna comprising at least three coils formed by a continuous wire, each of said at least three coils comprising several windings, said at least three coils being distributed along and around said at least one tunnel-shaped element, said at least three coils are perpendicular to the main axis of the at least one tunnel-shaped element, and said at least three coils are spaced apart from each other at regular intervals along said at least one tunnel-shaped element and are parallel to each other, wherein the at least three coils comprises at least one internal coil arranged between two external coils, wherein the at least one inner coil comprises as many windings as the two external coils or fewer windings than the two external.

\* \* \* \* \*